Figure 6:
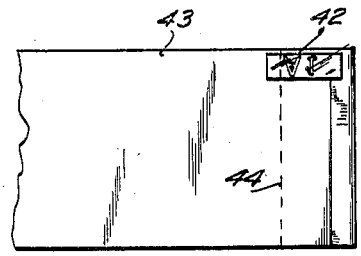

Feb. 8, 1944.  C. E. BOUCHER  2,340,923
METHOD AND APPARATUS FOR MAKING RADIOGRAPHS
Filed Dec. 1, 1942   2 Sheets-Sheet 1
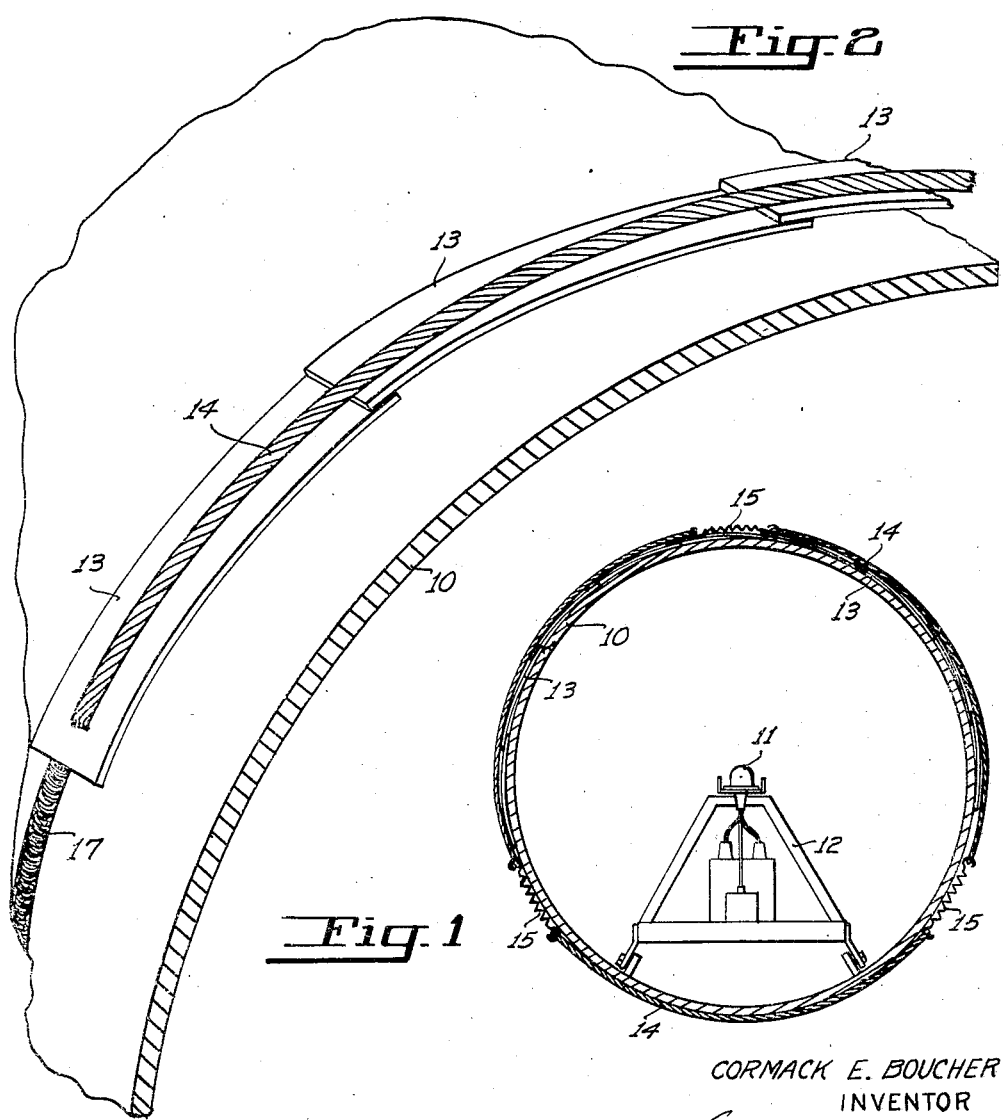
CORMACK E. BOUCHER
INVENTOR
BY [signature]
ATTORNEY Feb. 8, 1944.  C. E. BOUCHER  2,340,923
METHOD AND APPARATUS FOR MAKING RADIOGRAPHS
Filed Dec. 1, 1942  2 Sheets-Sheet 2

CORMACK E. BOUCHER
INVENTOR

BY
ATTORNEY

Patented Feb. 8, 1944

2,340,923

UNITED STATES PATENT OFFICE 2,340,923

METHOD AND APPARATUS FOR MAKING RADIOGRAPHS

Cormack E. Boucher, Seattle, Wash.

Application December 1, 1942, Serial No. 467,490

13 Claims. (Cl. 250—65)

The present invention relates to radiographic testing of metal objects through the use of penetrative rays.

Strength determinations of castings or welds in fabricated metal structures may be made by inspection of films exposed by X or gamma radiations passed through the metal. Voids, slag inclusions, shrinkage tears and other defects occurring within the metal variously affect the passage of the rays therethrough and the resultant exposure of the film so that the nature of the defect can be reasonably accurately determined by examination of the radiograph.

In radiographing walls of curved metal bodies, such as tanks or pipes, the source of penetrative rays may be arranged in the center of the cylinder and the film placed over the outer surface. While it may be possible to wrap a single continuous length of film about the periphery of the vessel and radiograph the entire well section in one exposure, it is generally considered impractical to do so. The film must be enclosed in a light-proof holder or cassette which, if very long, would be unwieldy to handle. Furthermore, it would be difficult to provide such holders of every conceivable length which might be required as well as the special dark-room equipment necessary for developing miscellaneous long lengths of film. It is preferred to use film in relatively short lengths which can readily be obtained in standard dimensions and developed with ordinary dark-room facilities. The short lengths of film can be conveniently handled, examined and filed away flat.

In radiographing an extended wall section with a plurality of individual films a problem is involved in marking the films with respect to the particular wall area covered by each and similarly marking the wall surface so that, following the development and examination of the various films, any defect noted therein can be traced to the exact location thereof in the metal object. The films cannot practicably be marked in the dark-room as they are loaded into the holders or as they are removed therefrom following the exposure thereof because of the likelihood of the films getting mixed up. Furthermore, because of the multiplicity of markings which must be placed upon the vessel wall surface a large amount of time is required for the procedure with the tendency for the markings to be inaccurately applied and improperly spaced.

According to prior practice, in arranging a plurality of individual film holders about a metal object in an end to end relation, there is always a likelihood that gaps might be permitted to exist between adjacent ends of consecutive films due either to the carelessness on the part of the operator or to accidental slippage of one or more of the holders after they have been placed. After the development of the films it cannot be ascertained with definiteness that the films actually cover the entire wall section which they are believed to span.

It is, therefore, an object of the present invention to provide a new and improved method of taking radiographs primarily adapted for industrial applications.

More specifically, it is an object of the present invention to provide a new and improved method of arranging a source of penetrative rays and films on the opposite sides of a curved metal wall whereby relatively large circumferential sections thereof may be radiographed with a high degree of precision and in a relatively short length of time.

A further object of the present invention is to provide a new and improved method for radiographing curved walls by exposing a plurality of films simultaneously from a source of penetrative rays, the films, upon exposure, being positively and accurately identified with respect to each other and to the wall section radiographed.

A still further object of the present invention is to provide a new and improved method of radiography with the use of X and the like radiations whereby a circumferentially extending weld in a curved wall of a hollow metal object may readily be radiographed upon a plurality of films of convenient size in a single operation.

Another object of the invention is to provide a new and improved method of arranging films over the surface of an object to be radiographed through the use of X and the like radiations whereby the films, upon exposure, are positively identified with respect to each other and to the surface of the object radiographed.

It is another object of the invention to provide a new and improved arrangement of a plurality of films upon the surface of an object to be radiographed through the use of X and the like radiations with means for positively and accurately marking the films with respect to each other simultaneously with the exposure thereof.

A still further object of the invention is to provide a new and improved film holder for use in radiographing relatively large areas of hollow metal bodies through the use of X and the like radiations in exposing a plurality of films simultaneously and having means for positively marking the ends of adjacent films with respect to each other.

And another object of the invention is to provide a new and improved film holder for use in radiographing relatively large areas of hollow metal bodies through the use of X and the like radiations in exposing a plurality of individual films simultaneously in combination with means whereby the adjacent ends of films are positively and accurately marked with respect to each other simultaneously with the exposure of the film.

In accordance with one form of the invention, a source of penetrative rays, such as an X-ray tube or a capsule of radium, is suitably supported within the vessel substantially at the center of the arc of the curved wall section which is to be radiographed. A plurality of films are suitably secured to the exterior surface of the wall section and arranged in an overlapping, end to end relation circumferentially of the vessel. The films are enclosed within a flexible light-proof envelope or holder with or without intensifying screens. The envelope or holder includes a backing for the film which is of a material substantially opaque to the penetrative rays so as to prevent fogging of the film due to secondary emissions. The backing is somewhat shorter than the film so that one end of the film projects beyond the end of the backing and the films are overlapped so that the unbacked end of the film lies underneath the end of the adjacent film. The wall section is marked with a reference character indicating a starting point and a suitable reference character of a material substantially opaque to the penetrative rays is placed directly over the marking on the wall section. The end of the first film is placed over this reference character so that the outline thereof will be radiographed upon the edge of the film so as to identify this film definitely with the starting point. Different reference characters also of a material relatively opaque to the penetrative rays are arranged underneath the overlapped end portions of the various films so that upon the exposure thereof the entire series of films will each be identified with respect to each other in the particular order in which they were arranged upon the wall section. Following development of the films and upon examination thereof, if a defect is noted in any film, the distance of the defect from the starting reference character can be accurately measured and which distance can then be scaled off on the vessel wall for the purpose of accurately locating the defect therein for the repair thereof.

Further objects and advantages of the invention will appear from the following description taken in connection with the accompanying drawings while the features of novelty characterizing the invention will be pointed out with greater particularity in the appended claims.

Figure 3:
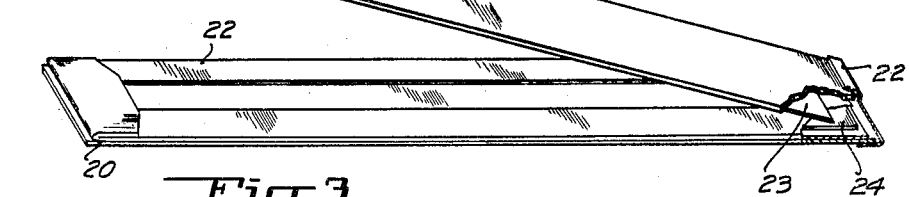
Figure 4:
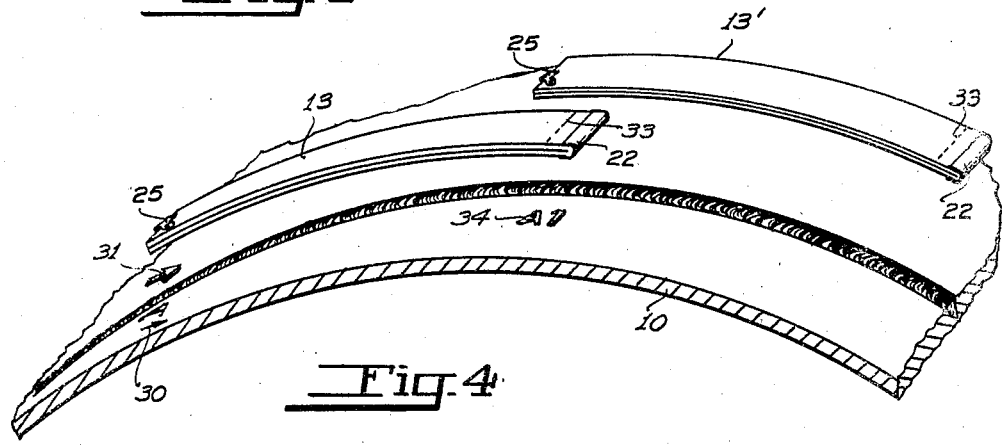
Figure 5:
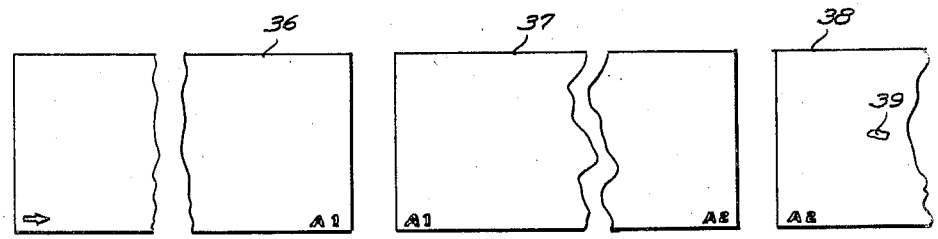

In the drawings Fig. 1 is a cross-sectional view of a cylindrical vessel or pipe illustrating the arrangement of a source of penetrative rays therein and also a plurality of loaded film holders secured to the outer surface of the vessel in accordance with one form of the invention; Fig. 2 is an enlarged view in perspective of a portion of the cylindrical wall shown in Fig. 1 illustrating in greater detail the arrangement of the film holders thereupon; Fig. 3 is a view in perspective of a film holder in a partly opened condition, portions thereof being broken away for more clearly illustrating certain details; Fig. 4 is an exploded view in perspective further illustrating the manner in which loaded film holders are arranged upon the outer surface of a metal wall; Fig. 5 is a view illustrating a series of radiographs exposed in accordance with the present invention; and Fig. 6 is a fragmentary view of one end of a film holder in accordance with a modification of the invention.

In the following description the invention will be described with particular reference to the radiographing of an annular weld in a large diameter cylinder, such as a vessel or pipe. It will become obvious, however, as the description proceeds that the present invention is not necessarily to be limited to this particular field of radiography in that it may equally well be used in testing curved wall sections of other hollow metal bodies or structures.

Referring first to Fig. 1, 10 indicates a cylindrical structure such as a pipe or tank having an annular weld which is to be radiographed for the determination of the soundness thereof. A source 11 of penetrative rays, such as an X-ray tube, is positioned by suitable supporting means 12 in the center of the cylinder, and so arranged that the penetrative rays are permitted to radiate outwardly toward the walls of the cylinder through a relatively wide angle. While the specific details are relatively unimportant insofar as the present invention is concerned, the particular X-ray tube and supporting arrangement therefor shown in Fig. 1 is more fully described and claimed in my co-pending patent application filed concurrently herewith and entitled "Industrial radiographic apparatus," Serial Number 468,602.

Instead of an X-ray tube, the source of penetrative rays may be a small capsule of radium salt or radium emanation gas, such as Radon.

Secured to the outer surface of the cylinder 10 are a plurality of loaded film holders 13 which are arranged circumferentially of the cylinder through a relatively wide angle, such as 180 degrees as shown, or throughout 360 degrees if desired. With the X-ray apparatus disclosed in the above mentioned co-pending application, radiographs of such wide angles may readily be made. The films are secured in position by means of an annularly extending rope 14 including a plurality of spaced tension springs 15 therein providing a certain amount of resiliency thereto for holding the film holders firmly against the metal wall.

Referring to the enlarged view of Fig. 2, the rope 14 is first secured around the cylinder closely adjacent the annular weld 17. The rope is preferably of a sufficiently large diameter that it may quite easily be grasped by the fingers of one hand and lifted a slight distance from the wall surface so that the film holders 13 may be placed therebeneath. The film holders are substantially centered over the weld and arranged longitudinally with respect thereto circumferentially of the cylinder in an overlapping end to end relation as shown. Since the source of penetrative rays is arranged substantially in the center of the arc of the curved wall 10 and, hence, uniformly spaced from all points thereof, the films in the holders 13 will all be substantially uniformly exposed thereby.

The holders 13 are preferably relatively flexible so that they will readily conform to the curvature of the cylindrical wall 10. In Fig. 3 is shown a suitable film holder comprising a base 20 and a cover flap 21 of a suitable material, such as cardboard, hinged together at one end as indicated at 22. Secured to the base 20 is a light-proof film enclosure or envelope 22. Intensifying screens may be placed over the film within the envelope and which will be held in firm engagement with the film when the film holder is bent into the curvature of the vessel wall. Secured to the underneath side of the cover 21 is a backing for the film which is of a material relatively opaque to the penetrative rays, such as a sheet of lead 23. The backing will effectively prevent fogging of the film due to secondary emission from nearby objects which may happen to be within an effective range of the radiations passing through the vessel wall. The backing 23 is of a length somewhat less than the length of the film enclosed within the envelope 22 so that one end portion of the film projects beyond the end of the backing. As shown in Fig. 3 the short end of the backing is at the hinged end of the holder, the portion of the film projecting therebeyond being indicated at 24. The film holder is adapted to be held closed by a suitable fastener, such as 25, secured to the free end of the cover 21.

Referring to Fig. 4, the manner in which the loaded film holders are arranged upon the outer wall surface will now be described. A starting point is first marked on the vessel wall 10, such as an arrow 30, which may be stamped into the metal surface. If there are a series of annular welds in the cylinder 10 which are to be radiographed, then it may be desirable to designate each by a suitable index, such as by the letter A, which may also be stamped into the wall adjacent the arrow 30. A reference character of a material relatively opaque to the penetrative rays, such as a small lead arrow 31, is then placed over the arrow 30 and may be secured to the metal surface by a small piece of adhesive tape. A first film holder 13 is then placed over the weld 17 with one edge portion thereof opposite the hinged end overlying the arrow 31 and extending in the direction indicated by the arrow. The rope 14 for holding the film holders in place has been omitted from Fig. 4, it being understood that the various film holders are arranged therebeneath. The next succeeding film holder 13' is then placed over the weld 17 and extending in the same direction as the first film holder, that is, so that the hinged end thereof is remote from the hinged end of the first film holder. The fastener end of the film holder 13' is lapped over the hinged end of the first film holder by a distance corresponding substantially to the length of the unbacked film portion 24 of the first film holder, the end of the lead backing being indicated by the dotted line 33.

Suitable reference characters of a material relatively opaque to the penetrative rays, such as small lead numerals or letters or combinations thereof, are placed underneath the overlapped ends of the film holders, as indicated at 34. After the desired number of film holders have been arranged over the weld 17 and underneath the securing means 14, previously referred to, and the series of reference characters inserted underneath the adjacent overlapped ends, they may be simultaneously exposed by energizing the source of penetrative rays, such as the X-ray tube.

Upon exposure of the films, the outline of the various reference characters 31—34 will be recorded upon the films. Since there is no lead backing provided over the end portion 24 of each film which is overlapped by the adjacent end of the next succeeding film, the reference character placed underneath the edge of the two overlapped film ends will be recorded upon both films. The lead backing extending over the foremost end of the upper film precludes fogging of the underneath unbacked film end portion by secondary radiations.

In Fig. 5 are shown a series of radiographs 36, 37 and 38, the opposite ends of each bearing the impressions or outlines of the various reference characters. Suppose now that a defect is noted in one of the films, such as is indicated at 39 in the film 38, and it is desired to locate the exact point thereof in the vessel weld for the purpose of repairing it. By virtue of the fact that the successive films are all positively identified with each other through the similar reference characters appearing on adacent ends, the effective coverage of each film, that is, the distance between corresponding points on the reference characters of each film is definitely known and, hence, the distance between the starting point or arrow on the film 36 and the defect 39 can be measured with a high degree of accuracy. This distance can then be scaled off on the outer surface of the cylinder wall from the arrow marking 30 and the exact location of the defect determined.

An important feature of the method of film arrangement and marking, as described, resides in the fact that it can be determined at a glance whether or not any gaps existed between the ends of adacent films at the time of the exposure thereof. Should any film have a marking on only one end, it is obvious that the blank end was spaced from the end of the next adacent film. This method, therefore, provides a convenient check upon the radiographer.

It will be obvious that in carrying out the method of the present invention, the film holders employed may be variously constructed. Any suitable light-proof envelope may be used with or without the lead backing. In radiographing with gamma ray emission sources, the lead backing may be dispensed with if desired. If a lead backing is provided, however, it is important that at least a portion of one end thereof be removed so as to allow the shadow of the reference characters placed beneath the overlapped film ends to pass on to the uppermost film.

In using film holders of the type shown more clearly in Fig. 3 having a metal fastening device 25 at the free end of the cover 25, then the unbacked film portion should be provided at the opposite or hinge end so that when the holders are overlapped the metal fastening device will be uppermost as shown in Fig. 4.

The various reference characters, such as the lead arrow and sequence indices 34 may, if desired, be attached to the underneath side of the various film holders and the film holders marked accordingly on the upper surface and arranged in the proper, predetermined sequence over the weld. It is preferred, however, that the reference characters be removably attached to the film holders, such as by a piece of adhesive tape, so that they may be readily changed in the event that the same holders are to be used in radiographing a series of annular welds and the radiographs of each weld of the series is to be labeled with corresponding serial numbers.

If the reference characters are to be attached directly to the film holders, it will be obvious that they need be applied only under the one end and under the film portion projecting beyond the end of the lead backing if such backing is used. In Fig. 6 is shown such a set of reference characters at 42 attached to the underneath side of a film holder 43, the end of the lead backing over the top of the film being indicated by the dotted line 44.

Having described the principle of the invention in what is considered to be a preferred form thereof, it is desired that it be understood that the specific details set forth are merely illustrative and that the invention may be carried out in other ways.

I claim:

1. The method of radiographing with penetrative rays which comprises placing a pair of films in an overlapping end to end relation upon the surface of the object to be radiographed, placing a reference character of a material relatively opaque to penetrative rays underneath the overlapped portions of said films and exposing said films with penetrative rays passed through said object.

2. The method of radiographing with penetrative rays which comprises arranging a pair of films in a slightly overlapping relation adjacent the surface of the object to be radiographed, placing a reference character of a material relatively opaque to penetrative rays between said object and the overlapped portions of said films, arranging a backing substantially opaque to penetrative rays over the upper surface of said films but not extending between the overlapped portions thereof, and exposing said films with penetrative rays passed through said object.

3. The method of radiographing with penetrative rays which comprises arranging a pair of films in a slightly overlapping relation adjacent the surface of the object being radiographed, marking the surface of the object underneath one of said films, placing a reference character over said marking and a second different reference character between said object and the overlapped portions of said films, said reference characters being of a material relatively opaque to penetrative rays, and exposing said films by penetrative rays passed through said object.

4. A method of radiographing curved walls of hollow metal bodies which comprises arranging a source of penetrative rays substantially at the center of the arc of the curved wall section to be radiographed, arranging a plurality of films upon the outer surface of said wall section in an overlapping end to end relation and extending circumferentially of said wall section, covering said films with a layer of a material relatively impermeable to said rays and placing identifying characters of a material relatively opaque to said rays underneath the overlapped ends of said films and exposing said films with said rays.

5. A method of radiographing a curved wall of a hollow metal body which comprises arranging a source of penetrative rays substantially in the center of the arc of the curve wall section to be radiographed, the rays radiating from said source throughout a relatively wide angle, securing a plurality of loaded film holders upon the outer surface of said wall section in an overlapping end to end relation and extending annularly thereof throughout said relatively wide angle, placing underneath the lowermost of the overlapped ends of said film holders reference characters of material relatively opaque to said rays and exposing said films simultaneously from said source, said reference characters causing a marking of said films in the order of their arrangement upon said section.

6. A method of radiographing curved walls of hollow metal bodies with penetrative rays, said method comprising arranging a source of penetrative rays substantially at the center of the arc of the curved wall and substantially in the radial plane of the wall section to be radiographed, placing a plurality of films upon the outer surface of said curved wall section in an overlapping end to end relation and placing identifying numerals of a material relatively opaque to said rays underneath the overlapped ends of said films whereby, upon exposure of said films, the ends thereof are effectively identified with each other.

7. A method of radiographing a curved wall of a hollow metal body which comprises arranging a source of penetrative rays substantially at the center of the arc of the curved wall section to be radiographed, placing a plurality of films upon the outer surface of said wall section in an overlapping end to end relation and extending circumferentially of said wall section, covering each of said films with exception of the end portion covered by the adjacent end of an overlapping film with a backing relatively opaque to said rays, placing a numeral of a material relatively opaque to said rays underneath the overlapped ends of said films and exposing said films with rays passed through said wall section.

8. A method of radiographing curved walls of hollow metal bodies which comprises arranging a source of penetrative rays substantially at the center of the arc of a curved wall section to be radiographed, marking one point on said wall section, placing a reference character of a material relatively opaque to said rays over said marking, arranging a plurality of films upon the outer surface of said wall section in an overlapping end to end relation and extending circumferentially of said wall section, the edge of one of said films being placed over said reference character, placing different reference characters underneath the overlapped ends of said films, said last mentioned reference characters being of a material relatively opaque to said rays and indicating the order of arrangement of said films upon said wall section and exposing said films simultaneously from said source of rays.

9. The combination comprising a light-proof envelope, a film contained in said envelope sensitive to penetrative rays, a backing for said film relatively opaque to penetrative rays, a reference character of a material relatively opaque to penetrative rays positioned beneath one edge portion of said film, a portion of said backing on the opposite side of said film with respect to said reference character being removed.

10. The combination comprising a light-proof envelope, a film contained in said envelope sensitive to penetrative rays, a backing for said film relatively opaque to penetrative rays secured to said envelope and separated thereby from said film, said backing being of such a length that one end portion of said film projects therebeyond, and a reference character of a material relatively opaque to penetrative rays placed beneath said one end portion of said film.

11. The combination comprising a light-proof envelope, a film contained in said envelope sensitive to penetrative rays, a backing for said film relatively opaque to penetrative rays, a portion of said film being uncovered by said backing, and a reference character of a material relatively opaque to penetrative rays secured to said envelope on the opposite side of said film portion with respect to said backing.

12. The combination comprising a double walled film holder adapted for receiving a film between said walls, one of said walls being readily permeable to penetrative radiations, a portion of the second of said walls being readily permeable to penetrative radiations passing through said one wall and a corresponding portion of the film arranged therebetween, the remainder of said second wall being relatively impermeable to said radiations.

13. The combination comprising a double walled film holder adapted for receiving a film between said walls, one of said walls being readily permeable to penetrative radiations, a portion of the second of said walls being readily permeable to penetrative radiations passing through said one wall and a corresponding portion of the film arranged therebetween, the remainder of said second wall being relatively impermeable to said radiations, and a reference character of a material relatively impermeable to said radiations arranged adjacent said one wall and beneath said portion of said second wall.

CORMACK E. BOUCHER.